United States Patent [19]
Dressler

[11] 4,367,462
[45] Jan. 4, 1983

[54] LIQUID LEVEL SENSING CIRCUITRY
[75] Inventor: Daryl D. Dressler, Saint Paul, Minn.
[73] Assignee: Minnesota Mining and Manufacturing Company, Saint Paul, Minn.
[21] Appl. No.: 222,616
[22] Filed: Jan. 5, 1981
[51] Int. Cl.³ .......................................... G08B 21/00
[52] U.S. Cl. ................................ 340/620; 73/304 R; 340/59
[58] Field of Search ............... 340/620, 59; 73/304 R, 73/304 C; 235/92 FL

[56] References Cited
U.S. PATENT DOCUMENTS
4,263,587 4/1981 John .................................. 340/620

Primary Examiner—John W. Caldwell, Sr.
Assistant Examiner—Daniel Myer
Attorney, Agent, or Firm—Cruzan Alexander; Donald M. Sell; Robert L. Marben

[57] ABSTRACT

A liquid level sensing circuitry using a conductive probe to sense and store an acceptable or unacceptable level signal. Any unacceptable level signal is stored a short time, determined by the circuitry, following termination of power to a power conductor. The circuitry provides a discernible indication of an unacceptable level when power is subsequently applied to the power conductor if an unacceptable level signal has been stored. A separate discernible signal is provided at such time if an acceptable level signal was stored.

7 Claims, 4 Drawing Figures

LIQUID LEVEL SENSING CIRCUITRY

BACKGROUND OF THE INVENTION

This invention relates to liquid level sensing circuitry and in particular to such circuitry suitable for the electronic detection of engine crankcase oil level for determining whether the oil is at an acceptable or unacceptable level.

Monitoring of the crankcase oil level for essentially all automobiles and engine driven equipment presently in use is carried out by the visual inspection of the oil level as indicated on a dip stick that must be manually withdrawn from an engine. Heretofore, gasoline station attendants carried out this messy procedure for automobiles as a service to customers, but the extent to which that service is available has dwindled due to the establishment of self-service gasoline stations. The burden of carrying out this messy task is left to the automobile operator who is generally reluctant to carry out the task because of its very messy nature. Many times the task is deferred until it can be done without soiling clothing and/or hands or until someone else can do it. This, of course, leads to long periods between oil level checks which in turn results in otherwise avoidable damage to the engine due to operation of the engine with a low crankcase oil level. While many automobiles have an oil pressure indicator that presents an indication when there is an oil pressure problem, the appearance of such an indication due to a low oil level is usually untimely in that the engine has already been operating at an unacceptable level for a long period of time.

SUMMARY OF THE INVENTION

The foregoing oil level monitoring problem is solved by the present invention which is also applicable to the monitoring of the level of other liquids. The invention is embodied in circuitry which in a preferred form has a first means including a conductive probe for providing a first signal when the liquid sensed is not in contact with the conductive probe. A second means is provided which is operatively connected to the first means and includes a switched electrical power conductor. The second means operates to store the first signal if the first signal is present at the completion of a time period following termination of electrical power to the switched electrical power conductor.

A third means is also included that is operatively connected to the second means and operates to provide a discernible indication in response to the storing of the first signal plus subsequent supply of electrical power to the switched electrical power conductor. The discernible indication is preferably one which is presented for a short period of time.

The first means also provides a second signal when the liquid sensed is in contact with the conductive probe. The second means responds to the second signal to store the second signal. The third means can be arranged to provide a temporary discernible indication when the second signal is present at the time electrical power is supplied to the switched electrical power conductor.

The third means may be of a form wherein one indicating device is operative to provide the discernible indication when the liquid level sensed is not in contact with the probe with a separate indicating device provided which is operative to produce the discernible indication eration to provide the operator with the desired information regarding the detected liquid level.

The present invention thus provides for detection and storage of a signal indicative of a low or unacceptable liquid level condition. The storage of such informtion occurs at the completion of a time period following termination of electrical power to a switch electrical power conductor. This is important in the case of its use as a crankcase oil level detector. Termination of the electrical power to the switched electrical power conductor can be accomplished by operation of the ignition switch to the off position with the time period following such termination allowing for drainage of the oil back to the crankcase area. Detection and storage of a signal due to an unacceptable level occurs while the oil is warm. With this arrangement, accurate level detection can be made even during extreme cold weather conditions as the possibility of erroneous detection due to the increased resistance of oil with a decrease in temperature of the oil is eliminated. The operator of the automobile is made aware of a low level condition by the discernible indication that is initiated at the time the ignition switch is operated to again apply electrical power to the switched electrical power conductor subsequent to the storage of the signal provided at the probe for such condition.

BRIEF DESCRIPTION OF THE DRAWINGS

The novel features and advantages of the present invention will become more apparent to those skilled in the art upon consideration of the following detailed description which refers to the accompanying drawing wherein.

DETAILED DESCRIPTION

Figure 1:
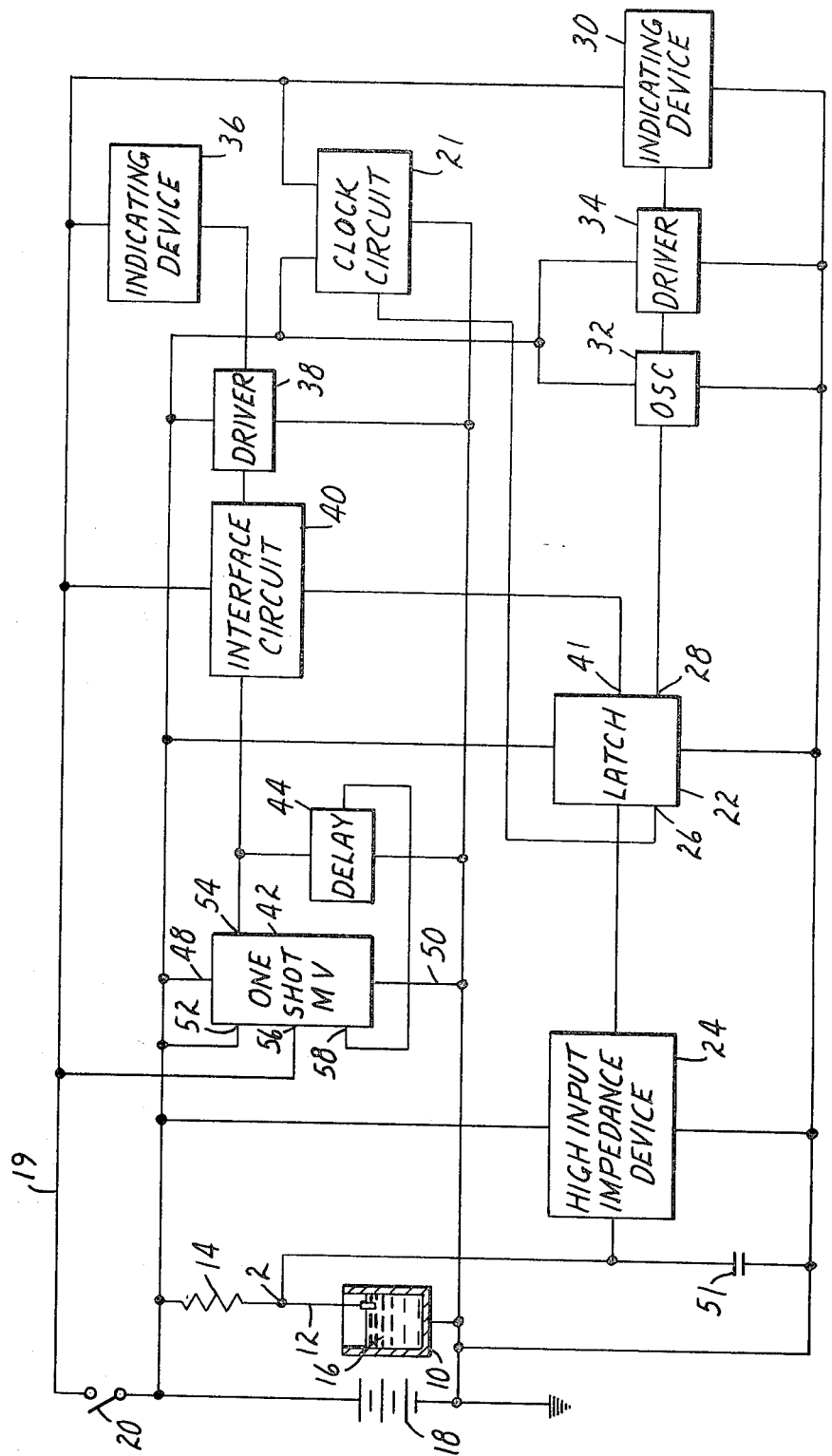
FIG. 1 is a block diagram of circuitry embodying the invention.
Figure 3:
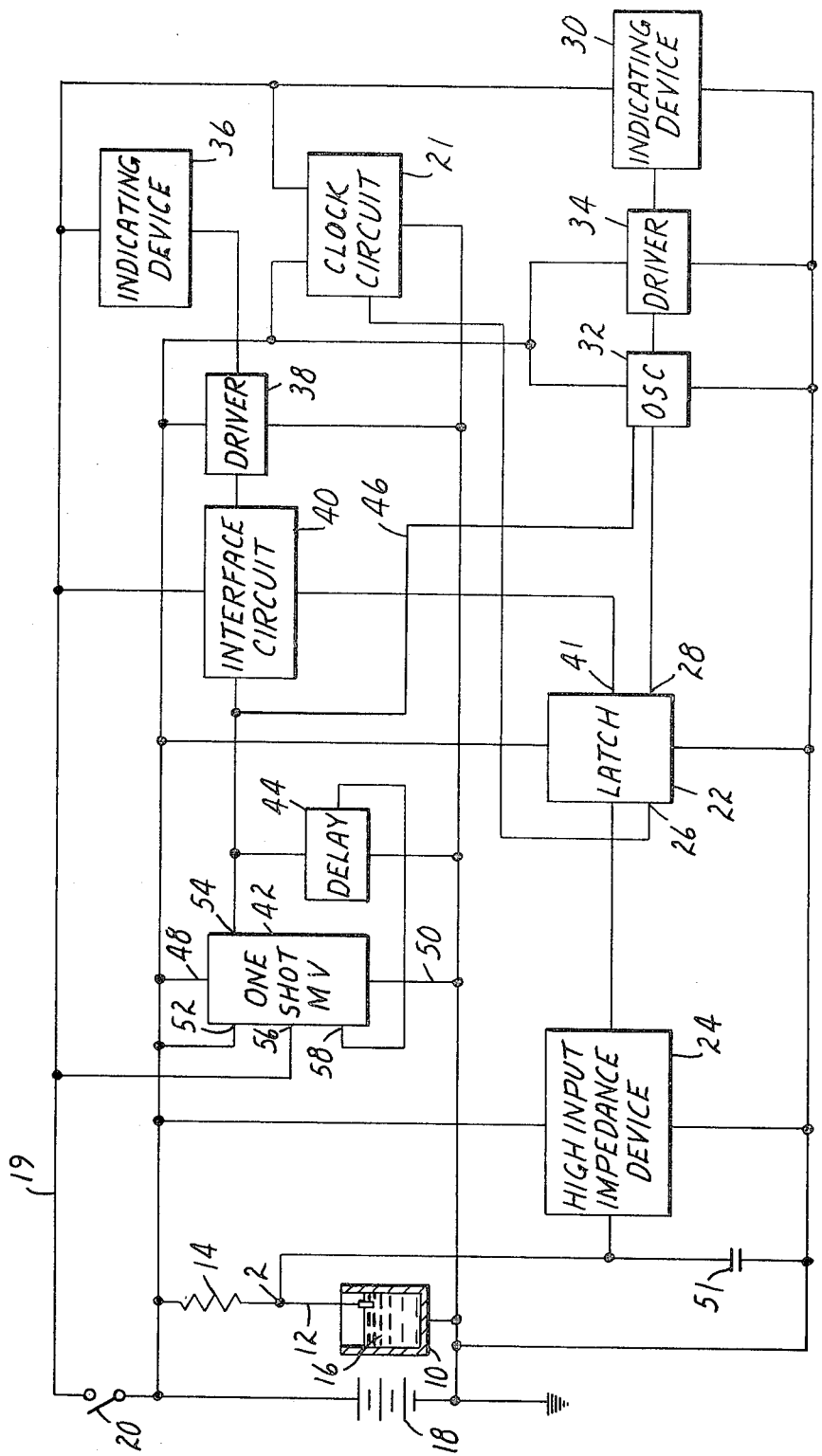
FIG. 3 is a block diagram of circuitry similar to FIG. 1.

Referring to FIG. 1 and FIG. 3 of the drawings, a liquid level sensing circuit embodying the invention is shown. Except for the connection 46 in FIG. 3, FIGS. 1 and 3 are identical. A first circuit portion is provided by the circuitry of FIG. 1 and FIG. 3 which provides a first signal when the liquid 16 in a container 10 is at an unacceptable level, i.e., not in contact with a conductive probe 12 with a second signal provided when the liquid is at an acceptable level, i.e., in contact with the probe 12. The first circuit portion includes a resistor 14 connected in series with the conductive probe 12. The liquid 16 is connected to circuit ground. This is accomplished via the ground connection made to a conductive container 10 for the liquid 16. The series circuit including resistor 14 and probe 12, the liquid 16 and container 10 are connected directly across a D.C. source 18, shown as a battery with the resistor 14 connected to the positive side of the source 18. The first and second signals appear at the common connection 2 for the resistor 14 and probe 12. The value of the resistor 14 is selected to be very much larger than the impedance presented by the probe 12 and the liquid 16. This being the case, the second signal, which is presented when the probe is in contact with the liquid 16, is about equal to zero since the probe is then essentially connected to the ground in comparison to the impedance presented by the resistance 14. The first signal, which is presented when the liquid 16 is not in contact with the probe 12, is equal to about the voltage provided by the D.C. source 18.

In the case where the circuitry is used to sense the oil level for an automobile engine, the value of the resistor 14 is on the order of $10^{10}$–$10^{11}$ ohms or greater. In addition, the container 10 is the oil pan for the vehicle and the probe 12 is provided by a conductor positioned in the opening in the engine normally used for the oil dip stick for the engine. It is necessary, of course, that the probe 12 be insulated from the engine. When using the circuit to monitor the level of the engine oil, the D.C. source 18 can be provided by the engine battery. The circuitry including the resistor 14 and probe 12 can be connected at all times to the battery 18 since it can only draw a very small level of current. The probe 12 extends into the crankcase area of the engine to the extent that it is out of contact with the engine oil when the oil is at the minimum acceptable level.

The circuitry of FIG. 1 and FIG. 3 incudes a second circuit portion, which has a switched electrical power cuit portion also includes a latch circuit 22 and a high input impedance device 24. The latch circuit 22 receives the first and second signals from the first circuit portion via the high impedance device 24. The device 24 is connected to be powered directly from the D.C. source 18. The latch circuit 22 stores the first signal received via the high impedance device 24 at the time a clock signal is received at the clock input 26 of the latch circuit and stores the second signal received via the device 24 independent of a clock signal. A clock circuit portion 21 is included in the second circuit portion to provide the latch circuit 22 with a clock signal which is supplied a period of time after switch 20 has been operated to its open position. The time period is selected to be about five minutes when the circuitry is used for engine oil level detection. The time period is sufficient to allow oil to drain into the oil reservoir area of the engine and provides for storage of a first signal condition while the oil is at a suitable temperature.

A one-shot timer can be used as a clock circuit portion 21 of the second circuit portion. The clock circuit 21 is connected directly to the D.C. power supply and also receives power via the switched power conductor 19. The clock circuit 21 provides a clock signal to the latch circuit 22 upon completion of a period of time following the opening of switch 20. As mentioned, the clock circuit 21 is designed to provide a period of time on the order of five minutes to make the circuitry suitable for engine oil level detection.

The liquid level circuit of FIG. 1 and FIG. 3 also includes a third circuit portion which is connected to the latch circuit 22 of the second circuit portion and includes circuitry responsive to the output 28 of the latch circuit 22 for providing a discernible indication when the latch circuit 22 has stored a signal in response to the second circuit portion receiving the first signal from the first circuit portion and power is applied to the switch power conductor 19 subsequent to the storage of the signal. The third circuit portion includes an indicating device 30 which when energized provides the discernible indication. The discernible indication continues until such time as the switch 20 is operated to its open position which is effective to terminate the application of electrical power to the indicating device 30 of the third circuit portion from the D.C. voltage source 18.

The third circuit portion for providing such a discernible indicating when power is applied to conductor 19 subsequent to the storage of a first signal presented to the second circuit portion also includes a drive circuit 34 for the device 30 and an oscillator 32. The oscillator is operative in response to the signal at output 28 of the latch circuit 22 when the first signal is stored by latch circuit 22. The oscillator 32 is connected to the driver circuit 34 which in turn is connected to the indicating device 30. With power applied to the conductor 19, the driver circuit 34 operates under the control of the oscillator 32 causing the indicating device 30 to be turned on and off in accordance with the frequency of operation of the oscillator 32. The indicating device 30 can, for example be a light source, such as a light emitting diode (LED), which is turned on and off at the frequency provided by the oscillator 32 or can be a sound producing device which is also turned on and off at the frequency provided by the oscillator 32. It is also possible to use a light producing device plus a sound producing device so the discernible indication is one of light plus sound.

The circuitry described to this point does not provide a discernible indication when the signal stored by the latch 22 of the second circuit portion is a signal due to the liquid 16 being at a level to contact the probe 12, i.e., the second type of signal available at the connection 2 to the probe 12. While it is not essential that a discernible indication be provided when the liquid is in contact with the probe 12, it is desirable to have a discernible signal for such condition since it provides the operator with a positive indication that the liquid level is at an acceptable level and also provides the operator with some assurance that the circuit will operate when the liquid is at an unacceptable level, i.e., out of contact with the probe 12. The additional circuitry needed to provide a discernible indication when the liquid is at a level to contact the probe 12 is included in the third circuit portion. The additional circuitry includes an indicating device 36, a driver circuit 38 for the indicating device 36 and an interface circuit 40 for connecting the driver circuit 38 to the output 41 of the latch circuit 22. The driver circuit 38 serves to drive the indicating device 36 to provide a discernible indication when power is provided to the switches power conductor 19 and the signal at signal point 2 is one that is due to the presence of liquid at the probe 12 which is stored directly in the latch 22 via the high impedance device 24. With this arrangement the operation of the indicating device is terminated when the switch 20 is moved to the open position. As in the case of the indicating device 30, the indicating device 36 can be a light source or can be a sound producing device or both.

When a liquid level circuit is used for the detection of the oil level for an automobile engine, it is preferred that the operator of the automobile be provided with a discernible indication for only a short period of time after the engine has been started should the oil level be at an acceptable level, i.e., in contact with the probe 12 at the time the switch 20 is operated to its closed position. This requires the use of some timing circuitry. Such timing circuitry is provided by the third circuit portion and can be in the form of a one-shot multivibrator 42 and a delay 44 which are operatively connected to the driver 38 for indicating device 36 to provide for termination of the operation of indicating device 36 a short time following the initiation of its operation. If it is desired that operation of indicating device 30 be terminated a short time following the initiation of its operation, the circuitry of FIG. 3 is used wherein the oscillator 32 is connected to the delay 44 via the connection 46. If such automatic termination arrangement is not used for device 30, as is the case for the circuitry of FIG. 1, it is desirable to connect the oscillator 32 to the D.C. source 18 via the conductor 19 rather than directly as shown in FIG. 1.

The conductors 48 and 50 provide for the power connection of the multivibrator 42 to the battery 18. The input 52 of the multivibrator 42 is connected to the positive side of battery 18, so a logic "1" appears at the output 54 of the multivibrator when a clock signal is applied to its clock input 56. The clock input 56 is connected to the switched power conductor 19 so a logic "1" appears at output 54 upon closure of the switch 20. The interface circuit 40 which connected to the output 54 of multivibrator 42 and to the output 41 of latch 22, is arranged to cause driver 38 to provide for the operation of the indicating device 36 when the output 41 of latch 22 is due to the signal provided at the probe 12 when it is in contact with the liquid 16 and a logic "1" is present at the output 54 of the multivibrator. The subsequent presence of a logic "0" at the output 54 of the multivibrator 54 serves to disable the operation of the indicating device 36. The delay 44 is connected between the output 54 and the reset input 58 of the multivibrator. The delay 44 serves to delay the application of a logic "1" from the output 54 to the reset input 58. A logic "1" when applied to the reset input 58 causes the output 54 to present a logic "0" terminating any operation of the indicating device 36. This logic "0" remains until the switch 20 is again operated to its closed position. In the case of FIG. 3 where the oscillator 32 is connected to the output 54, oscillator operation is inhibited by a logic "0" at output 54. The delay provided by delay 44 is one that allows any operation of either of the indicating devices 30 and 36 to continue for a time sufficient to attract the attention of the person who caused switch 20 to close. A delay of 30 to 40 seconds is acceptable.

Figure 2:
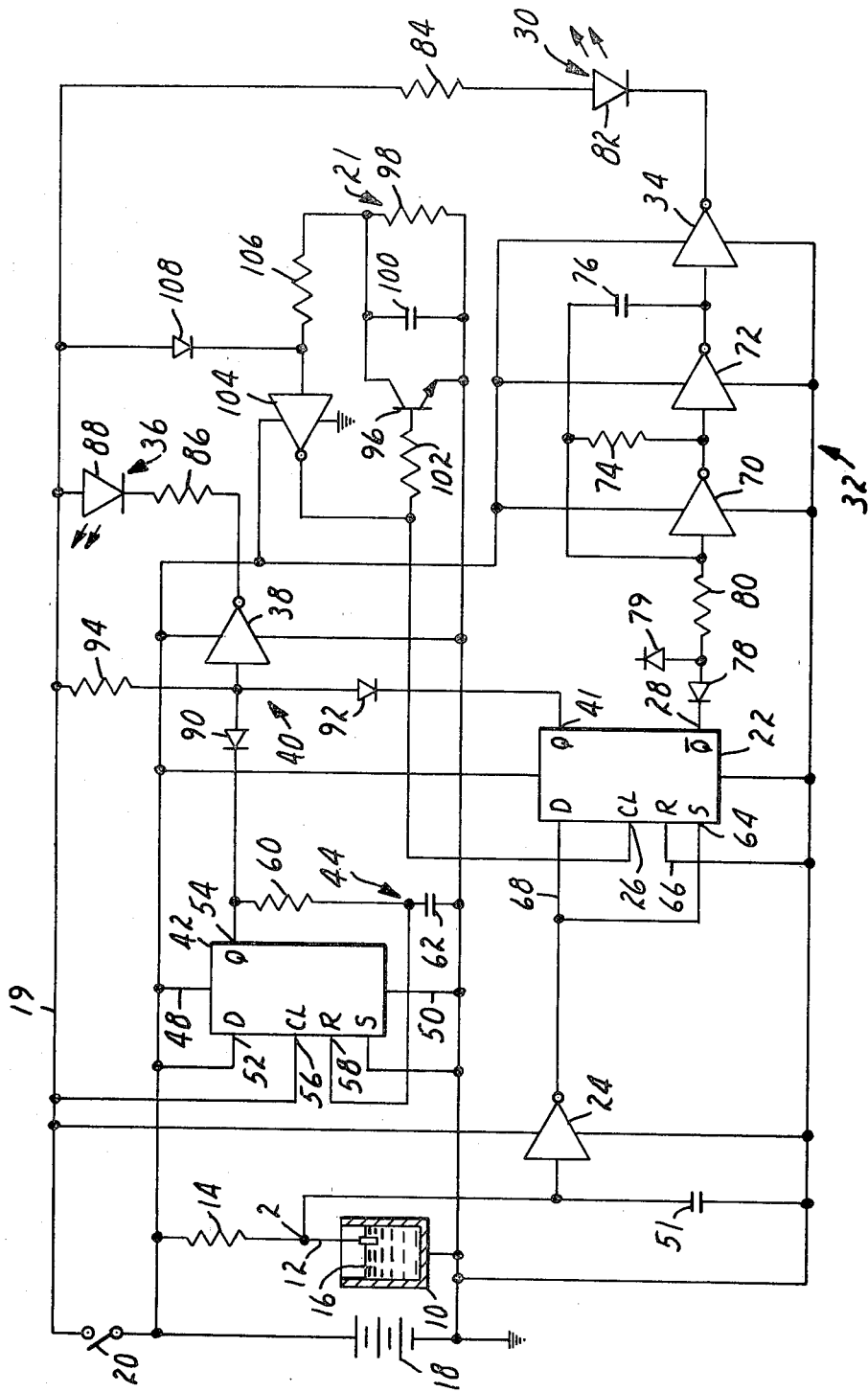
FIG. 2 is a schematic circuit showing circuit details for circuitry in accordance with FIG. 1.
Figure 4:
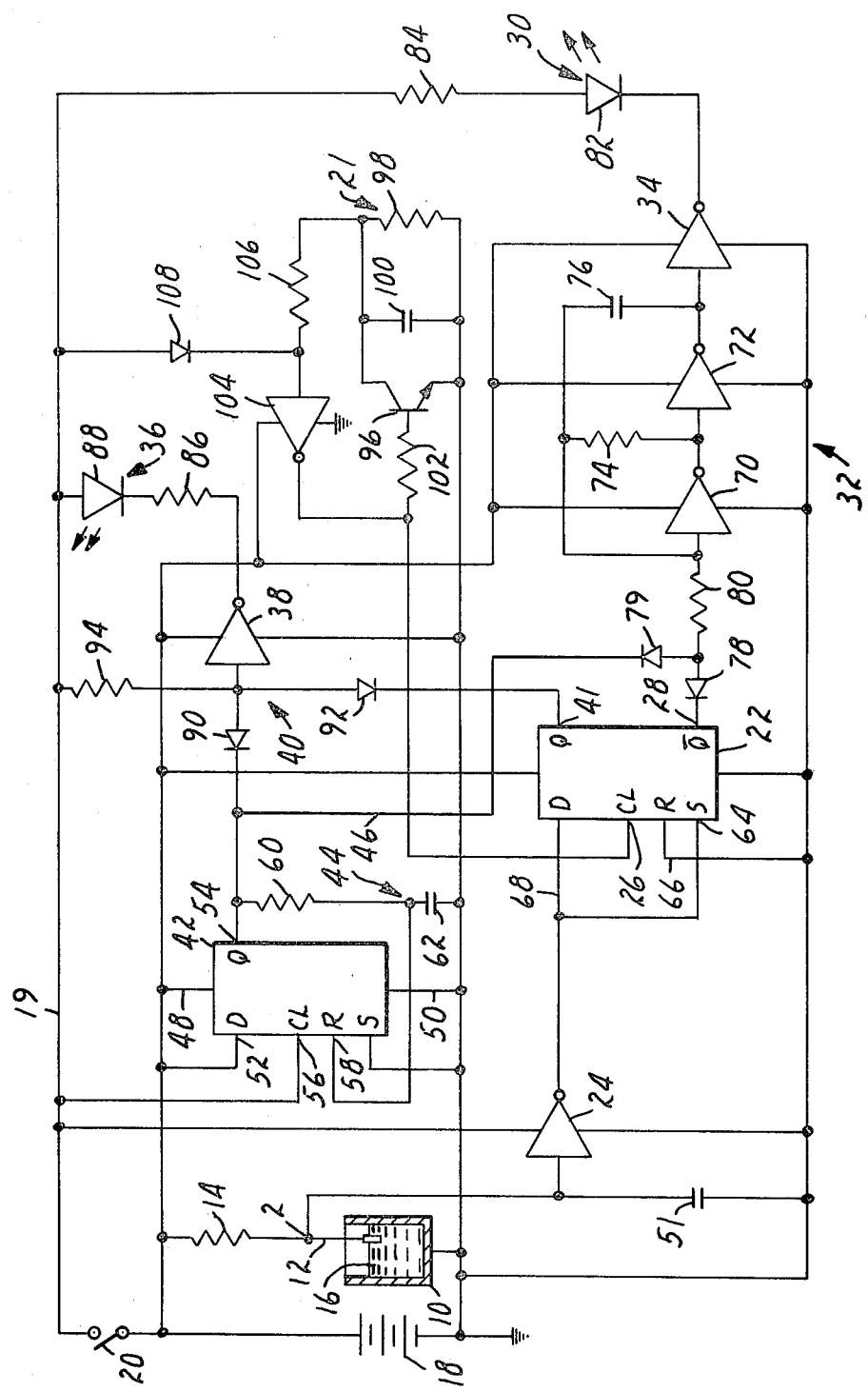
FIG. 4 is a schematic circuit showing circuit detail for circuitry in accordance with FIG. 3.

Referring to FIG. 2 and FIG. 4, exemplary circuits are shown for the circuit portions of FIGS. 1 and 3, respectively, that appear only in block diagram form. A number of inverters are used since they are high input impedance devices and are available wherein six are provided on a single substrate. Suitable inverters are available under the type designation CD 4049. One of the inverters is used as the high input impedance device 24. To avoid any problems that may be due to noise presented to the input of the inverter 24, a bypass capacitator 51 may be connected between the input to the inverter and ground. This bypass capacitor is not needed if a shielded cable is used in the construction of the probe 12 and its connection to the inverter 24. In either case, however, a time constant is presented by the circuit making it desirable to connect the resistor 14 directly to the D.C. source 18. The delay circuit 44 can be provided by a resistor 60 connected in a series with a capacitor 62 with the common connection for the resistor and capacitor connected to the reset input 58 for the one-shot multivibrator 42 that is formed using a "D" type flip-flop device. Such a device is available under the type designation CD 4013. The D input 52 for the multivibrator is connected to the positive side of the D.C. source 18. The operation of the multivibrator circuit 42 is such that a clock signal, a positive going 1" signal at the D input to be present at the Q output 54 of the multivibrator. A reset signal presented to the reset input 58 for the multivibrator from the delay 44 will cause the Q output 54 to present a low or logic "0" signal. The latch circuit 22 can also be provided by a CD 4013 device (D-type flip-flop). The output of the inverter 24 is supplied to the D input 68 of the latch circuit 22 and to the set input 64 of latch circuit 22. The reset 66 for the latch circuit 22 is connected to ground. When a high or logic "1" signal is presented at the D input 68 the latch circuit 22, it is also presented at the same time to the set input 64 causing the high signal to be transferred immediately to the Q output 41 of the latch circuit 22. Thus, if a high logic signal is presented at the output of the inverter 24, it will be transferred immediately to the Q output 41 of latch circuit 22. If a low or logic "0" signal is presented at the output of the inverter 24, it will be transferred to the Q output 41 of latch circuit 22 only when a clock signal is received at clock input 26 of latch circuit 22 from the clock circuit 21. The oscillator 32 is provided by two series connected inverters 70 and 72 plus a resistor 74 and capacitor 76. The resistor 74 has one end connected to the connection that is common to the output of inverter 70 and the input of inverter 72 with its other end connected to the output of the inverter 72 via the capacitor 76. The connection common to resistor 74 and capacitor 76 is connected to the input of inverter 70. The oscillator includes a diode 78 which in series with a resistor 80 connects the input of inverter 70 to the not Q output 28 of the latch circuit 22. The diode 78 is poled so its cathode is connected to the latch circuit 22. The oscillator 32 also includes a diode 79 which has its anode connected to the connection common to the diode 78 and resistor 80. The diode 79 is provided for connection to the Q output 54 of the one-shot multivibrator 54 via conductor 46 in the circuitry of FIG. 4. This causes the operation of the oscillator to be terminated a short time after its operation is initiated by the operation of switch 20 to the closed position with a logic "1" present at the not Q output 28 of latch 22. A logic "0" present at the Q output 54 of multivibrator upon completion of the delay provided by delay 44 terminates operation of the oscillator 32 and therefore operation of the indicating device 30. With this arrangement the oscillator 32 will not operate unless a logic "1" is present at the Q output 54 of the multivibrator 42 and at the not Q output 28 of the latch 22. As has been mentioned, if the oscillator 32 operation is not to be automatically terminated via the operation of the multivibrator 42 and delay 44, as in the case for FIG. 2, it is desirable to power the oscillator 32 from conductor 19 rather than directly from battery 18, as shown, so that it will not operate until a logic "1" is present at the not Q output 28 of latch 22 and switch 20 is closed to provide power to conductor 19 and thence to the oscillator 32. An inverter 34 is suitable for the driver circuit 34. The input for the inverter 34 is connected to the output of inverter 72 of the oscillator 32. The output of the inverter 34 is connected to the indicating device 30, which is shown as a light emitting diode (LED) 82 and a resistor 84. The LED 82 and the resistor 84 are connected in series between power conductor 19 and the output of inverter 34. The driver circuit 38 for the indicating device 36 is provided by an inverter 38. The indicating device 36 is provided by a series circuit, including a resistor 86 and an LED 88, connected between the conductor 19 and the output of inverter 38. The interface circuit 40 includes diodes 90 and 92 plus a resistor 94. The anode of each diode is connected to the input of inverter 38. The cathodes of diodes 90 and 92 are connected to the Q output 54 of multivibrator 42 and the Q output 41 of latch 22, respectively. The resistor 94 is connected between the conductor 19 and the input of inverter 38.

The clock circuit 21 is provided by a one-shot timer which includes an NPN type transistor 96 which has a parallel RC circuit provided by resistor 98 and capacitor 100 connected between its collector and emitter electrodes. The timer 21 also includes a resistor 102 connected at one end to the base electrode with its other end connected to the collector electrode via an inverter 104 and resistor 106. The output of the inverter is connected to the resistor 102. The input of the inverter 104 is connected to the conductor 19 via a diode 108 which has its cathode connected to the input of inverter 104. The output of the inverter 104 is connected to the clock input 26 of the latch 22. When the switch 20 is closed the transistor is off and capacitor 100 is charged via the diode 108 and resistor 106. The output provided by inverter 104 is then a logic "0." When switch 20 is operated to its open position a time period, about five minutes, is provided by the RC circuit before a clock pulse is provided by the output of inverter 104. Capacitor 100 discharges via resistor 98 until the input to inverter 104 drops to a level sufficient to cause its output to go high thereby providing a clock signal to the clock input of latch 22. With the output of the inverter 104 high, the transistor 96 is turned "on" to rapidly complete the discharge of capacitor 100. If a logic "0" is present at the D input 68 of latch 22 from inverter 24 due to the probe 12 not being in contact with the oil 16, such logic "0" signal will be stored as a logic "0" at the Q output 41 and as a logic "1" at the not Q output 28 when the clock signal is provided from the timer 21.

Operation of the circuitry of FIG. 2 and FIG. 4 will now be reviewed. For purposes of the review, it will be assumed the circuitry is used to detect the crankcase oil level for an automobile engine. An initial condition is assumed wherein the oil 16 is at an acceptable level, i.e., in contact with probe 12. When the operator of the automobile starts the engine, switch 20 is operated to its closed position to provide power to the conductor 19. A logic "1" signal is present at the Q output 41 of latch 22 at the time switch 20 is closed since the signal provided at the connection 2 at probe 12 is a logic "0" which is inverted by the inverter 24 to provide a logic "1" to the D input 68 and the set input 64 of latch 22. Since a timing function is provided by the multivibrator 42 and delay 44 for controlling the period of time that the LED 88 will be turned on upon closure of switch 22 when a logic "1" signal is presented at the Q output 41 of latch 22, the operation of the multivibrator 42 and the delay 44 must be considered. The multivibrator 42 is provided with a logic "1" at its D input 52 which is transferred to the Q output 42 by a clock signal provided to the clock input 56. A clock signal is provided at the time the switch 20 is operated to its closed position. With the Q output 54 of the multivibrator 42 and the Q output 41 of the latch 22 presenting a logic "1," the input to the inverter 38 will be high causing its output to be low allowing the LED 88 to conduct and provide an indication until such time as the Q output 54 of multivibrator 42 presents a logic "0." The presence of a logic "0" at the Q output 54 of the multivibrator 42 causes the input to the inverter 38 to be low causing its output to be high preventing conduction of the LED 88. A logic "0" is provided at the Q output 54 when the delay 44 operates to charge its capacitor 62 to provide a reset signal to the reset input 58 of the multivibrator 42.

If the timing circuitry provided by the multivibrator 42 and the delay 44 were not used as a part of the circuitry, the operation of the LED 88 would continue until switch 20 was operated to the open position. It should be noted that the operation of the indicating device 30 is inhibited when the Q output 41 of latch 22 is a logic "1" since the not Q output 28 of latch 22 is then a logic "0" which inhibits the operation of the oscillator 32 and therefore the operation of the indicating device 30.

When operation of the automobile engine is terminated, the switch 20 is operated to its open position which terminates the application of power to the clock circuit 21 causing the clock circuit 21 to operate. The clock circuit 21 provides a clock pulse to the clock input 26 of the latch circuit 22 about 5 minutes after the switch 20 was operated to its open position. During the 5 minute period provided by the clock circuit 21, the oil in the engine drains into the crankcase area. Assuming the level of the oil 16 is then not sufficient to make contact with the probe 12, a logic "1" signal will be presented to the inverter 24 causing its output to present a logic "0" signal to the D input 68 of latch 22. When the clock signal is then received from the clock circuit 21 by the latch circuit 22, the logic "0" signal at its D input 68 is transferred to the Q output 41 as a logic "0" and is transferred to the not Q output 28 as a logic "1." In the case of FIG. 2 where the connector 46 is not utilized, the presence of a logic "1" at the not Q output of latch 22 causes operation of the oscillator 32 and upon operation of the switch 20 to the closed position when the automobile engine is again to be started, the LED 82 of the indicating device 30 is turned on and off in accordance with the frequency of operation of the oscillator 32 and continues until the switch 20 is again operated to its open position. In the case of FIG. 4 where connector 46 is used to connect diode 79 to the Q output 54 of the multivibrator 42, the operation of the oscillator 32 is inhibited prior to closure of switch 20 by a logic "0" at the Q output 54 of the multivibrator 42. The logic "0" signal at the Q output 54 of the multivibrator 42 is changed to a logic "1" signal in response to a clock signal provided to the multivibrator upon closure of the switch 20 when the automobile is to be operated allowing the oscillator 32 to operate the cause the LED 82 to present a discernible indication that the oil level is not acceptable. Such operation of the oscillator 32 continues until a logic "0" signal is again presented at the Q output 54 of the multivibrator 42 which will occur upon operation of the delay 44 to present a reset signal to the reset input 58 of the multivibrator 42.

Since the indication provided by the operation of the LED 82 is an indication that the oil in the crankcase is at an unacceptable level, the operator will normally add oil to the engine to bring it to an acceptable level so that the next operation of the engine will be initiated when the probe 12 is in contact with the oil to cause the LED 88 to be energized as described above to indicate an acceptable oil level.

One advantage of the disclosed level sensing circuitry when used to detect engine crankcase oil resides in the feature of storing a level signal when the engine oil is warm. If sufficient oil has drained down to provide an acceptable oil level signal, a logic "1" is stored in latch 22. Should the engine then be subjected to very cold temperatures, the oil can become too resistive to provide an acceptable oil level signal. With the disclosed circuitry such a condition would not result in an erroneous indication to the operator when switch 20 is again operated to the closed position as the latch 20 stored an acceptable oil level signal when the engine was warm. When the switch 22 is operated to the closed position such stored signal will provide for the operation of LED 88 to provide an indication that the oil level is acceptable.

It will be understood by those skilled in the art that various changes in form and detail may be made to the circuitry disclosed without departing from the spirit and scope of the invention.

I claim:

1. Liquid level sensing circuitry adapted for energization from a source of electrical power including:

first means, including a conductive probe, for providing a first signal when the liquid sensed is not in contact with said conductive probe;

second means operatively connected to said first means, said second means including a switched electrical power conductor adapted for energization from the source of electrical power via a switch, said second means storing said first signal if said first signal is present at the completion of a time period following termination of electrical power to said switched electrical power conductor; and third means operatively connected to said second means for providing a discernible indication in response to the storing of said first signal plus subsequent supply of electrical power to said switched electrical power conductor.

2. The liquid level sensing circuitry of claim 1 wherein said first means provides a second signal when the liquid sensed is in contact with said conductive probe, said second means responding to said second signal to store said second signal and said third means providing a temporary discernible indication in response to the storage of said second signal and the supply of electrical power to said switched electrical power conductor.

3. The liquid level sensing circuitry of claim 2 wherein said third means includes a first discernible indication producing device for providing said first-mentioned discernible indication and a second indication producing device for producing said second-mentioned discernible indication.

4. The liquid level sensing circuitry of claim 3 wherein said third means includes a timing means operatively connected to said second discernible indication producing device for limiting the time said second-mentioned discernible indication is provided.

5. The liquid level sensing circuitry of claim 3 wherein said third means includes a timing means operatively connected to said first and second discernible indication producing devices for limiting the time said first and second mentioned discernible indications are provided.

6. The liquid level sensing circuitry of claim 1 wherein said second means includes a latch circuit operatively connected to said first means, said latch circuit operatively connected to said first means, said latch circuit responding to a clock signal for storing said first signal when present, said third means including a clock circuit operatively connected to said switch electrical power conductor and to said latch circuit for providing a clock signal to said latch circuit at the completion of a time period determined by said clock circuit following termination of electrical power to said switched electrical power conductor.

7. Liquid level sensing circuitry adapted for energization from a source of electrical power including:

first means, including a conductive probe, for providing a first signal when the liquid sensed is not in contact with said conductive probe;

second means operatively connected to said first means, said second means including a switched electrical power conductor adapted for energization from the source of electrical power via a switch, said second means storing said first signal if said first signal is present at the completion of a time period following termination of electrical power to said switched electrical power conductor; and third means operatively connected to said second means for providing a discernible indication of limited time duration in response to the storing of said first signal plus subsequent supply of electrical power to said switched electrical power conductor.

* * * * *

UNITED STATES PATENT AND TRADEMARK OFFICE
CERTIFICATE OF CORRECTION

PATENT NO. : 4,367,462
DATED : January 4, 1983
INVENTOR(S) : DARYL D. DRESSLER

It is certified that error appears in the above—identified patent and that said Letters Patent is hereby corrected as shown below:

Column 2, line 1, after "indication" delete -- eration -- and insert -- when the liquid level sensed is in contact with the probe. The use of two indicating devices is preferred, particularly if it is a visible indication that is produced, allowing the use of separate colors and, if desired, steady or flashing operation --.

Column 3, line 24, delete "cuit" and insert -- conductor 19 shown connected to the positive terminal of the D.C. voltage supply 18 via a switch 20. In the case of an engine, the switch 20 can be one that is operated under the control of the normal ignition switching device. The second circuit --.

Column 4, line 2, change "indicating" to -- indication --.

Column 4, line 45, change "switches" to -- switched --.

Column 5, line 66, before "1" insert -- signal, presented to the clock input causes the signal presented to the D input to be transferred to the Q output. Closure of the switch 20 provides a clock signal to the clock input 56 of the one-shot multivibrator 42 causing a logic " --.

Column 8, line 47, change "the" (second occurrence) to -- and --.

Signed and Sealed this

Twelfth Day of April 1983

[SEAL]

Attest:

GERALD J. MOSSINGHOFF

Attesting Officer

Commissioner of Patents and Trademarks